United States Patent
Desabhatla et al.

(10) Patent No.: US 9,590,550 B2
(45) Date of Patent: Mar. 7, 2017

(54) SYSTEMS AND METHODS FOR ADAPTIVE CONTROL OF EXCITATION AND GENERATOR SYSTEMS

(71) Applicant: General Electric Company, Schenectady, NY (US)

(72) Inventors: Sreedhar Desabhatla, Munich (DE); Adrien Cabarbaye, Cambridge (GB); Julian Bonilla Alarcon, Garching b. Munchen (DE); Kate Johannesen, Longmont, CO (US)

(73) Assignee: General Electric Company, Schenectady, NY (US)

( * ) Notice: Subject to any disclaimer, the term of this patent is extended or adjusted under 35 U.S.C. 154(b) by 465 days.

(21) Appl. No.: 14/157,405

(22) Filed: Jan. 16, 2014

(65) Prior Publication Data

US 2015/0200615 A1     Jul. 16, 2015

(51) Int. Cl.
*H02J 3/24*     (2006.01)
*H02P 9/10*     (2006.01)

(52) U.S. Cl.
CPC .............. *H02P 9/105* (2013.01); *H02J 3/24* (2013.01); *H02P 9/10* (2013.01)

(58) Field of Classification Search
None
See application file for complete search history.

(56) References Cited

U.S. PATENT DOCUMENTS

| | | | | |
|---|---|---|---|---|
| 4,080,559 A | * | 3/1978 | Wright | ............... H02P 9/105 322/25 |
| 5,483,147 A | | 1/1996 | Ilic et al. | |
| 5,977,731 A | * | 11/1999 | Xia | ............... H02P 9/105 318/147 |

(Continued)

FOREIGN PATENT DOCUMENTS

| | | |
|---|---|---|
| CN | 101242103 B | 1/2011 |
| CN | 101447670 B | 1/2011 |

(Continued)

OTHER PUBLICATIONS

European Search Report and Written Opinion issued in connection with corresponding EP Application No. 15151154.0-1806 dated Jun. 12, 2015.

(Continued)

*Primary Examiner* — Isaac T Tecklu
(74) *Attorney, Agent, or Firm* — Fletcher Yoder, P.C.

(57) ABSTRACT

A system includes an excitation system. The excitation system includes a memory configured to store an adaptive power system stabilizer (PSS) system configured to dynamically stabilize the operation of a generator system, and a processor communicatively coupled to the memory and configured to utilize the adaptive PSS system according to a value for one or more operational parameters of the generator system. The derived value is applied by the processor to operate the generator system when the generator system exhibits oscillations at least one of a plurality of operating frequency ranges associated with an oscillation of a power (Continued)

angle of the generator system. The derived value is configured to attenuate the oscillation of the power angle over the at least one of the plurality of interval operating frequency ranges.

19 Claims, 4 Drawing Sheets

(56) References Cited

U.S. PATENT DOCUMENTS

| | | | | |
|---|---|---|---|---|
| 7,149,605 | B2* | 12/2006 | Chassin | H02J 3/14 |
| | | | | 700/286 |
| 7,912,589 | B2 | 3/2011 | Korba et al. | |
| 8,019,484 | B2 | 9/2011 | Korba et al. | |
| 2010/0067269 | A1* | 3/2010 | Heber | H02M 7/219 |
| | | | | 363/87 |
| 2011/0276150 | A1 | 11/2011 | Al-Duwaish et al. | |
| 2012/0004781 | A1* | 1/2012 | Santos | F03D 7/0284 |
| | | | | 700/287 |
| 2012/0200166 | A1* | 8/2012 | Berggren | H02J 3/24 |
| | | | | 307/102 |
| 2012/0226385 | A1* | 9/2012 | Williams | H05B 37/0227 |
| | | | | 700/295 |
| 2013/0257166 | A1* | 10/2013 | Chen | H02J 3/24 |
| | | | | 307/102 |
| 2013/0257347 | A1 | 10/2013 | Ou | |
| 2014/0017083 | A1* | 1/2014 | Pineda Amo | F03D 7/06 |
| | | | | 416/37 |
| 2014/0032000 | A1* | 1/2014 | Chandrashekhara | H02J 3/382 |
| | | | | 700/292 |

FOREIGN PATENT DOCUMENTS

| | | |
|---|---|---|
| EP | 1489714 A1 | 6/2003 |
| JP | 2000050502 A | 2/2000 |

OTHER PUBLICATIONS

Cheng et al., "Damping of Multi-Modal Oscillations in Power Systems Using a Dual-Rate Adaptive Stabilizer", IEEE Transactions on Power Systems, vol. No. 3, Issue No. 1, pp. 101-108, Feb. 1988.

Zhang et al., "An Artificial Neural Network Based Adaptive Power System Stabilizer", IEEE Transactions on Energy Conversion, vol. No. 8, Issue No. 1, pp. 71-77, Mar. 1, 1993.

El-Metwally et al., "Fuzzy logic power system stabiliser" IEE Proceedings: Generation. Transmission and Distribution, vol. No. 142, Issue No. 3, pp. 277-281, May 1, 1995.

Alspa ControGen HX [online], [retrived on Jun. 25, 2013], 2 pages, http://www.alstom.com/Global/Power/Resources/Documents/Brochures/alspa-controgen-hx-generator-control.pdf.

Corcau, Jenica Ilena and Eleonor Stoenescu; Fuzzy Logic Controller as a Power System Stabilizer, International Journal of Circuits, Systems and Signal Processing; 2007; 8 pages; Issue 3 vol. 1.

* cited by examiner

SYSTEMS AND METHODS FOR ADAPTIVE CONTROL OF EXCITATION AND GENERATOR SYSTEMS

BACKGROUND

The subject matter disclosed herein relates to power generating systems, and more specifically, to the adaptive control of power generating systems.

Certain systems such as generators and distributed generator may include voltage regulators to perform various monitoring and control operations, such as magnetic field excitation and regulation. Excitation controllers may receive various feedback signals to provide control flexibility, but most generally include voltage and current feedback signals to regulate and control the output of, for example, generators, turbines, motors, or other similar synchronous machines of, for example, a power generating system. The control functions may include the control of voltage, reactive power flow, and the overall stability of the power system. However, under certain operating conditions, the generating system may become unstable to the point that a conventional excitation controller and/or conventional power system stabilizer (CPSS) may dampen oscillations, but may not be as effective as desired in dampening the rotor oscillations. Specifically, the conventional excitation controller and/or CPSS may not dampen the rotor oscillations in such a manner that may produce desirable output and performance. It may be useful to provide more advanced PSS systems.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A system includes an excitation system. The excitation system includes a memory configured to store an adaptive power system stabilizer (PSS) system configured to dynamically stabilize the operation of a generator system, and a processor communicatively coupled to the memory and configured to utilize the adaptive PSS system according to a value for one or more operational parameters of the generator system. The derived value is applied by the processor to operate the generator system when the generator system exhibits oscillations at least one of a plurality of operating frequency ranges associated with an oscillation of a power angle of the generator system. The derived value is configured to attenuate the oscillation of the power angle over the at least one of the plurality of interval operating frequency ranges.

A non-transitory computer-readable medium having computer executable code stored thereon, the code comprising instructions to derive sets of values for one or more operational parameters of a generator system. Each of the derived sets of values corresponds to a respective one of a plurality of interval operating frequency ranges associated with an oscillation of a power angle of the generator system, and wherein the derived sets of values are configured to attenuate the oscillation of the power angle over each of the plurality of interval operating frequency ranges.

A system includes an excitation system. The excitation system includes a memory configured to store an adaptive power system stabilizer (PSS) system configured to dynamically stabilize an operation of the power generating system, and a processor communicatively coupled to the memory and configured to utilize the adaptive PSS system to derive a first set of values for one or more operating conditions of the power generating system when the power generating system is operational in a first state and a second set of values for the one or more operational parameters when the power generating system is operational in a second state. The second set of values is configured to attenuate an oscillation of a power angle associated with the power generating system over a complete operational output of the power generating system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
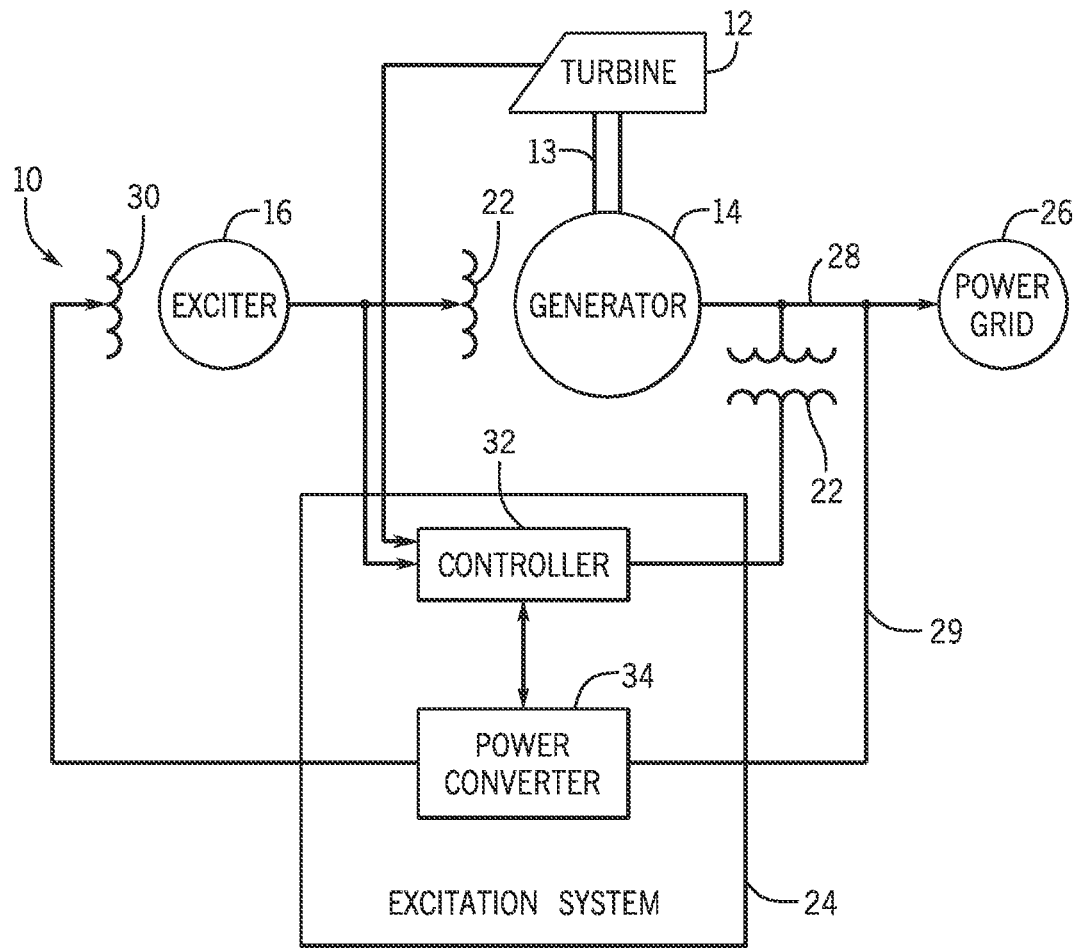
FIG. 1 is a block diagram of an embodiment of a turbine-generator system in accordance with present embodiments.

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Present embodiments relate to systems and methods for dynamically damping generator power angle oscillations. Particularly, an adaptive PSS system is provided to continuously and adaptively derive PSS settings values for each of a variety of oscillation frequency ranges (e.g., inter-tie frequency range, local frequency range, intra-plant frequency range, and so forth) of a generator, and thus damp generator rotor angle oscillations over the entire generator operating and/or output curve. Accordingly, such an adaptive PSS system may improve grid power production in a variety of locales, including locales in developing nations that may have more variability of infrastructure and more frequent grid disturbances. By accommodating a variety of oscillation frequencies, for example, the techniques described herein may improve power production, power stability, and power generation. As used herein, "power system stability" may refer at least to the ability of a power system and associated components (e.g., grid, generators, turbines, and so forth) to transition from, for example, a steady-state operating point (e.g., nominal operating point) to, for example, one or more other operating points (e.g., transient and/or dynamic operating points) following a perturbation, a disturbance, or other undesired impact to the power system. Furthermore, as used herein, "damp," "damping," and/or "damped oscillation" may refer to an act or result of a decreasing of amplitude of an oscillation with time. Similarly, "new operating parameter," "new state," or "new operating condition" may refer to the operating point and/or operating conditions the power system and associated components (e.g., grid, generators, turbines, and so forth) may periodically and/or aperiodically transition to during operation following, for example, the perturbation, the disturbance, or other undesired impact to the power system.

With the foregoing in mind, it may be useful to describe an embodiment of a power generating system, such as an example power generating system 10 illustrated in FIG. 1. The power generating system 10 may include various subsystems such as a turbine 12, a generator 14, and an exciter 16. The turbine 12 (e.g., gas turbine, steam turbine, hydro-turbine, and the like) may be coupled the generator 14 via a shaft 13. The generator 14 may be in turn communicatively coupled to the generator exciter 16. The exciter 16 may provide a direct current (DC) to field windings 22 of the generator 14. Particularly, the exciter 16 may provide a DC field current (e.g., the current utilized by the field windings 22 of the generator 14 and/or other synchronous machine to establish a magnetic field for operation) to excite the magnetic field of the generator 14. For example, the exciter 16 may be a static (e.g., power electronic) or rotating (e.g., brush and/or brushless) exciter. In other embodiments, the exciter 16 may be bypassed, and a power output may directly energize the field windings 22 of the generator 14. As also depicted, the output terminals of the generator 14 may be coupled to a large scale utility power grid 26 via alternating current (AC) lines 28. Alternatively, the output terminals of the generator 14 may be coupled to a small industrial power generation plant.

The power generating system 10 may also include an excitation system 24, which may provide various control parameters to each of the generator 14 and/or the exciter 16. In certain embodiments, the excitation system 24 may function as an excitation control for the generator 14 and the exciter 16. The excitation system 24 may include one or more controllers 32 and one or more power converters 34. The power converter 34 may include a subsystem of integrated power electronic switching devices such as silicon-controlled rectifiers (SCRs), thyristors, insulated gate bipolar transistors (IGBTs), and so forth, that receive alternating current (AC) power, DC power, or a combination thereof from a source such as, for example, the power grid 26. The excitation system 24 may receive this power via a bus 29, and may provide power, control, and monitoring to the field windings 30 of the exciter 16 based thereon. Thus, the excitation system 24 and the exciter 16 may operate collectively to drive the generator 14 in accordance with a desired output (e.g., grid voltage, power factor, loading frequency, torque, speed, acceleration, and so forth). As an example, in one embodiment, the excitation system 24 may be an excitation controller system, such as the EX2100e™ regulator, available from General Electric Co. of Schenectady, N.Y.

In certain embodiments, the power grid 26, and by extension, the turbine 12 and the generator 14 may be susceptible to certain disturbances due to, for example, transient loss of power generation by the generator 14, power line 28 switching, load changes on the power grid 26, electrical faults on the power grid 26, and so forth. Such disturbances may cause the operating frequencies (e.g., approximately 50 Hz for most countries of Europe and Asia and approximately 60 Hz for countries of North America) of the turbine 12 and/or the generator 14 to experience undesirable oscillations that may lead to system 10 transient and/or dynamic instability. Such transient and/or dynamic instability may cause the generator 14, as well as the turbine 12 and exciter 16, to transition from a steady-state operating point to a transient and/or dynamic operating point. Specifically, frequency deviations on the power grid 26 may cause generator 14 rotor angle swings (e.g., power angle oscillations) throughout the power system 10. Moreover, because conventional power system stabilizer (CPSS) systems (e.g., systems used to damp the generator 14 rotor angle oscillations) that may be generally configured according to linear, fixed parameters, the CPSS systems, unlike the adaptive PSS techniques described herein, may not damp the generator 14 rotor angle oscillations effectively over the entire dynamic operating range of the generator 14, as desired and may even create or increase instabilities.

Thus, as will be discussed in further detail below, in certain embodiments, the controller 32 of the excitation system 24 may include an adaptive power system stabilizer (PSS) system 40 (shown in FIG. 2) that may be implemented as part of the excitation system 24 to dynamically and adaptively regulate (e.g., dynamically and adaptively damp) frequency oscillations of, for example, the rotor of the generator 14, and thus enhance the ability of the system 10 to seamlessly move to the transient and/or dynamic operating point or to substantially return to the steady-state operating point, or to survive the transition to a new steady-state operating point (e.g., derived by the adaptive PSS) and to maintain stable operation at the new steady-state operating point.

Figure 2:
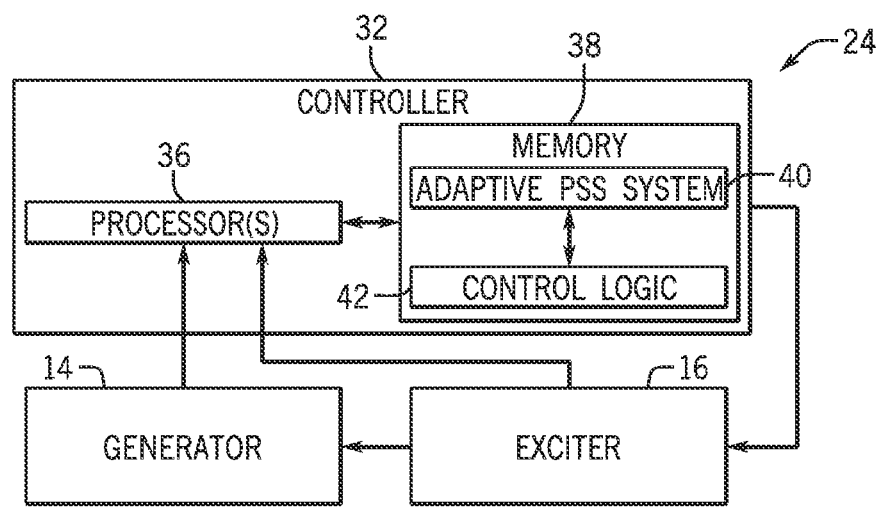
FIG. 2 is a schematic diagram of an embodiment of an excitation system included in the system of FIG. 1 including an adaptive power system stabilizer (PSS), in accordance with present embodiments.

Turning now to FIG. 2, the figure illustrates a detailed block diagram of an embodiment of the controller 32 included in the excitation system 24 (shown in FIG. 1). As generally illustrated, the controller 32 may include one or more processors 36 and a memory 38, which may be used collectively to support an operating system, software applications and systems, and so forth, useful in implementing the techniques described herein. Particularly, the controller 32 may include code or instructions stored in a non-transitory machine-readable medium (e.g., the memory 38 and/or other storage) and executed, for example, by the one or more processors 36 that may be included in the controller 32. The processor 36 may receive various operating state parameters (e.g., terminal voltage, real power (P), reactive power (Q), power factor, frequency, and so forth), which may be used by the adaptive PSS system 40 to derive and control (e.g., via the one or more processors 36) operating parameters of interest such as, for example, oscillations in real power (P) of the generator 14.

For example, as previously discussed above with respect to FIG. 1, under certain loading conditions (e.g., due to load demand changes on the power grid 26), the turbine 12, the generator 14, as well as other components that may be included within the power generating system 10 may be susceptible to transient and dynamic instability. In particular, system 10 frequency variations and/or changes in operating conditions may cause generator 14 rotor angle swings (e.g., oscillations). For example, the ranges of frequencies may include low frequency inter-tie mode frequencies (e.g., approximately 0.1-1.0 Hz), local mode frequencies (e.g., approximately 1-2.0 Hz), and intra-plant mode frequencies (e.g., approximately 2.0-3.0 Hz). Accordingly, the adaptive PSS system 40 (e.g., executed via the one or more processors 36) may be used to add damping (e.g., attenuation of the amplitude of the generator 14 rotor angle oscillations with time) to the generator 14 rotor angle oscillations by controlling generator 14 excitation.

In certain embodiments, the adaptive PSS system 40 may be a software system, or in other embodiments, a combination of software and hardware that may be used to generate appropriate operating state parameters of the generator 14 based on, for example, real power (P) (e.g., MW), reactive power (Q) (e.g., kVar), power factor, frequency, terminal voltage), and so forth. The adaptive PSS system 40 may thus damp the generator 14 rotor angle oscillations over a broad range of frequencies. In certain embodiments, the adaptive PSS system 40 may derive PSS settings for each frequency sub range of a set of partitioned operating frequency ranges of the generator 14. Specifically, the adaptive PSS system 40 may derive a set of specific linearized models of the system (e.g., based on real power (P), reactive power (Q), apparent power (S), power factor, frequency, terminal voltage, and so forth) such that the new PSS controller with optimized settings 32 may damp generator 14 rotor angle oscillations over, for example, each of the inter-tie oscillation frequency range (e.g., approximately 0.1-1.0 Hz), local oscillation frequency range (e.g., approximately 1.0-2.0 Hz), and intra-plant oscillation frequency range (e.g., approximately 2.0-3.0 Hz), and so forth.

In some embodiments, the adaptive PSS system 40 may derive specific PSS settings for each of any number of partitioned operating frequency ranges of the generator 14. For example, instead of, or in addition to the inter-tie oscillation, local oscillation, and intra-plant oscillation frequency ranges, the adaptive PSS system 40 may derive specific PSS settings for frequency ranges partitioned according to 0.5 Hz sub ranges (e.g., 0.1-0.5 Hz, 0.5-1.0 Hz, 1.0-1.5 Hz, 1.5-2.0 Hz, and so on), 0.2 Hz sub ranges (e.g., 0.2-0.4 Hz, 0.4-0.6 Hz, 0.6-0.8 Hz, 0.8-1.0 Hz, and so on), 0.1 Hz sub ranges (e.g., 0.1-0.2 Hz, 0.2-0.3 Hz, 0.3-0.4 Hz, 0.4-0.5 Hz, and so on), and/or according to some other user-configurable or application-specific frequency sub range.

In other embodiments, the adaptive PSS system 40 may derive multiple sets of specific PSS settings for overlapping partitioned frequency sub ranges (e.g., a set of PSS settings for frequency sub ranges of 1.0-2.0 Hz and different set of PSS settings for frequency sub ranges of 0.5-1.0 Hz and 1.0-2.0 Hz), and may contrive a determination as to which set of PSS settings may be most suitable (e.g., most closely match) for the given operating conditions of the system 10, for example. In these manners, the adaptive PSS system 40 (e.g., executed via the processor 36) may individually derive PSS settings for each possible oscillation frequency range (e.g., inter-tie frequency sub range, local frequency sub range, intra-plant frequency sub range, and/or other user-configurable frequency sub ranges), and apply the appropriate PSS settings based on, for example, the current operating conditions. Thus, the adaptive PSS system 40 may derive settings to adaptively damp generator 14 rotor angle oscillations over the entire operating output curve of the generator 14, and may thus provide for faster and substantially seamless response to transient and/or dynamic instability of the generator 14 and/or turbine 12, and by extension, the system 10.

In certain embodiments, the adaptive PSS system 40 (e.g., executed via the processor 36) may generate the suitable PSS settings by deriving specific PSS settings that are part of a training data set derived for specific turbine 12 and/or generator 14 operating conditions (e.g., based on whether the turbine 12 and/or generator 14 are operating at base load levels of 70-80% rating, peak load levels of 90-100% rating, and so forth). Particularly, the adaptive PSS system 40 of the controller 32 may iteratively derive a set of rules based on, for example, field voltage and current (e.g., voltage and current on the field windings 22 of the generator 14), real power (P), reactive power (Q), and terminal voltage that may be defined to identify the PSS settings that are most appropriate for the specific operating conditions of the turbine 12 and/or the generator 14 and/or turbine 12. For example, the adaptive PSS system 40 may implement techniques such as statistical methods (e.g., linear regression, non-linear regression, data mining) and artificial intelligence or machine learning models (e.g., neural networks, expert systems, support vector machines (SVMs), logic reasoning systems) that may be used to analyze the training data sets and to construct a knowledgebase of suitable PSS settings to respond to new dynamic operating conditions.

In certain embodiments, the PSS settings derived by the adaptive PSS system 40 may be dynamically updated (e.g., in real-time or near real-time) to further improve control and damping of the exciter 16, and by extension, the rotor angle swings of the generator 14. For example, as further illustrated in FIG. 2, the adaptive PSS system 40 may interface with control logic system 42. In one embodiment, the adaptive PSS system 40 may be a fuzzy logic controller (FLC) (e.g., or other artificial intelligence-based controller), which may be a rule-based system (e.g., fuzzy rules and/or expert system rules) used to select and determine the most suitable PSS settings for each possible generator 14 operating parameter (e.g., terminal voltage and current, speed and acceleration, and so forth) of the PSS settings derived, for example, by the adaptive PSS system 40 as part of training data set of operating parameters. It is to be understood that while the logic control system 42 may include fuzzy logic-based techniques, the adaptive PSS system 40 may include, additionally or alternatively, other techniques including forward or backward chained expert systems, data mining techniques (e.g., clustering, classification), logic programming techniques (e.g., Prolog, Datalog), neural network techniques, and the like.

In certain embodiments, as previously noted, the adaptive PSS system 40 may utilize fuzzy logic (and/or other intelligence models) to adapt to the current power grid 26 conditions. In one embodiment, the adaptive PSS system 40 may further include one or more input filters (e.g., Butterworth filters, RLS filters, LMS filters, Kalman filters, Chebyshev filters, and/or similar filters) on the state variable inputs (e.g., inputs corresponding to real power (P), reactive power (Q), terminal voltage, and so forth) to the adaptive PSS system 40 to render the adaptive PSS system 40 substantially immune to transient electrical faults that may occur on the power grid 26. Specifically, by using the input filters, the adaptive PSS system 40 may attenuate and/or filter any fluctuations in the state input variables resulting from, for example, electrical faults on the power grid 26. Thus, the adaptive PSS system 40 may be responsive to actual and/or persistent variations in the operating state of the generator 14. In some embodiments, the adaptive PSS system 40 may map a set of input parameters (e.g., real power P, reactive power Q, generator 14 terminal voltage, and so forth) that define the operating state of the generator 14 to an optimal (e.g., most suitable) set of output parameters. The set of output parameters may include, for example, PSS lead, lag, and gain constants, which may be specifically and automatically tuned to the particular operating state of the generator 14.

For example, in certain embodiments, the inputs to the adaptive PSS system 40 may be fuzzy linguistic variables. Specifically, the crisp, or absolute value of the fuzzy linguistic variable may be assigned a degree of "truth" in each of several input membership functions by the adaptive PSS system 40. Similarly, the rules may include a set of if-then statements that take the degree of "truth" the fuzzy linguistic variable includes as an input membership function, and may assign that degree of "truth" to the corresponding output membership function. The adaptive PSS system 40 may then defuzzify the resolution of the activated output membership functions into one crisp, or absolute value for the output of the adaptive PSS system 40. This resolution may be accomplished by the adaptive PSS system 40 calculating the weighted average of the values of the output membership functions, in which the weights may be the respective degree of "truth" in those output membership functions.

In certain embodiments, the adaptive PSS system 40 along with the control logic 42 of the controller 32 may continuously and adaptively derive PSS settings values for each possible oscillation frequency range (e.g., inter-tie frequency range, local frequency range, intra-plant frequency range, and so forth) of the generator 14 and/or the turbine 12, as well as continuously update the training data sets via the control logic 42. In other words, the PSS system 40 may "learn" during actual operations, and thus be customized with minimum effort to a specific installation. In this way, the adaptive PSS system 40 in conjunction with the control logic 42 may provide training set of data values for oscillation frequency range (e.g., inter-tie frequency range, local frequency range, intra-plant frequency range, and so forth) and damp generator 14 rotor angle oscillations over the entire generator 14 operating and/or output curve.

Figure 3:
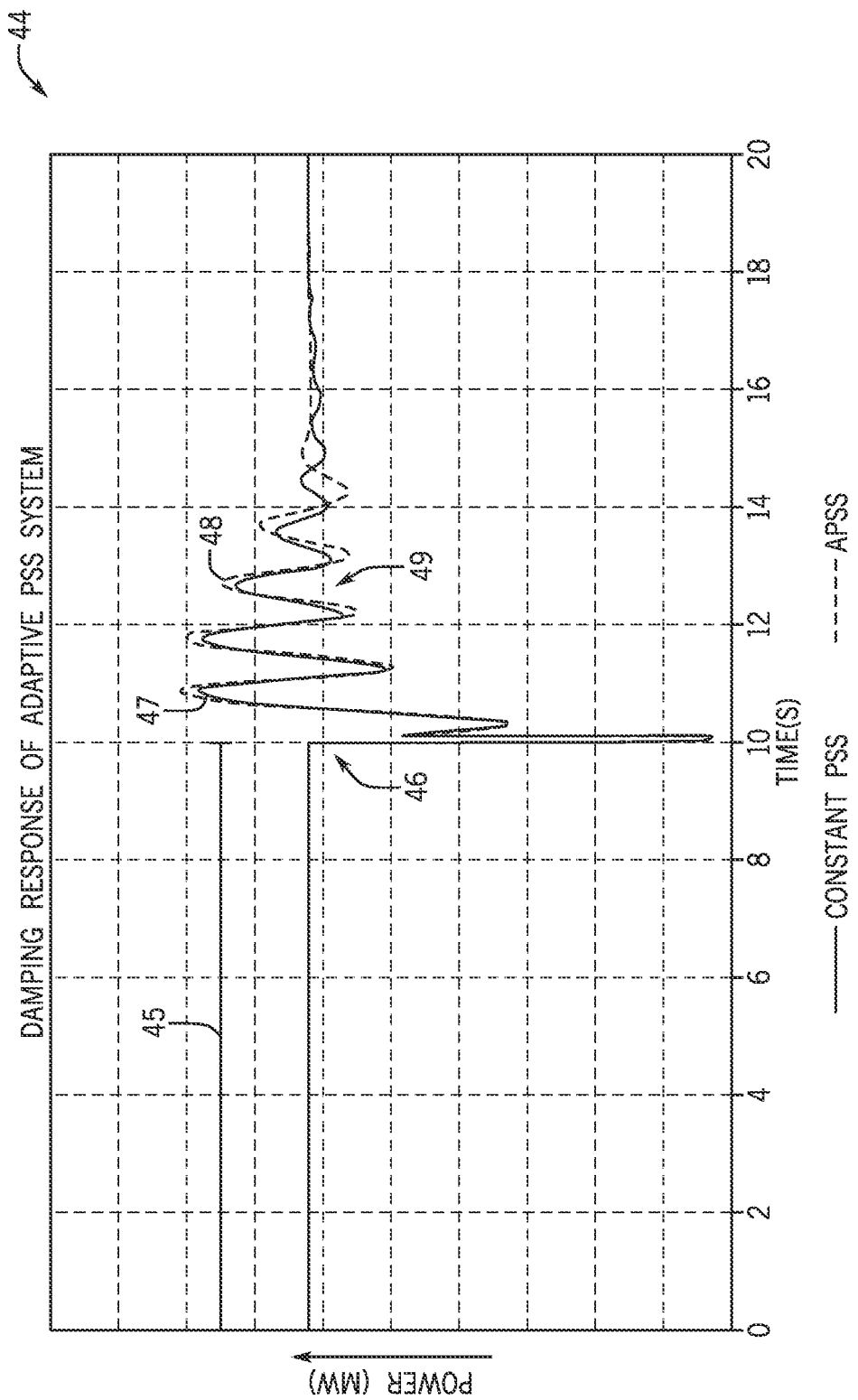
FIG. 3 is a plot diagram illustrating output power (MW) damped by the adaptive PSS system of FIG. 2, in accordance with present embodiments.

As a further illustration of the presently disclosed techniques, FIG. 3 displays a plot diagram 44 illustrating an example real power (e.g., MW) signal initially at steady state (e.g., at time 0) operating value during a period of time denoted by the numeral 45, and that begins to oscillate (e.g., due generator 14 rotor angle swings) at a point in time denoted by the numeral 46. As further illustrated, the plot diagram 44 displays the real power (e.g., MW) signal damped, for example, by a CPSS (e.g., damped oscillation response 47) and the adaptive PSS system 40 (e.g., damped oscillation response 48) 48. As previously noted above, oscillation damping (e.g., damped oscillation response 47) performed, for example, by a CPSS may not be able to damp to the generator 14 rotor angle oscillations over the entire operating frequency range and/or operating curve of the generator 14. This may lead impacts system 10, for example, such as prolonged durations at which the generator 14 rotor angle swings (e.g., power angle oscillations) of the generator 14, thus contributing to overall instability of the system 10.

For example, as illustrated at point in time denoted by the numeral 49, when power system stabilization is applied by both a CPSS and the adaptive PSS system 40 (e.g., at approximately 12 seconds), the damped oscillation response 47 continues to exhibit oscillations well pass the point in time (e.g., at approximately 16 seconds) at which oscillations illustrated by the damped oscillation response 48 cease. Thus, the adaptive PSS system 40 is shown to damp the real power (e.g., MW) signal approximately back to the original steady-state value (e.g., as that illustrated over period of time denoted by the numeral 45) much quicker and more efficiently, as the adaptive PSS system 40 damps generator 14 rotor angle oscillations over the entire operating frequency range and/or operating curve of the generator 14.

Figure 4:
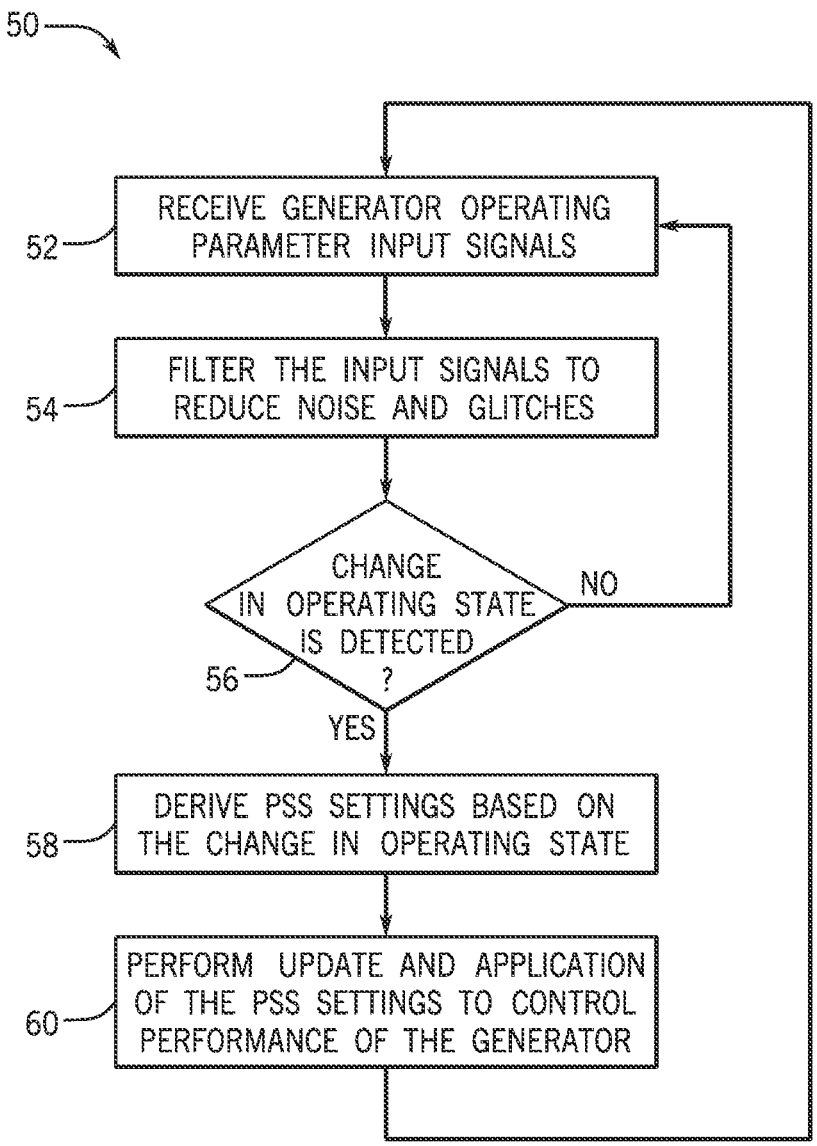
FIG. 4 is a flowchart illustrating an embodiment of a process suitable for adaptively damping generator rotor angle oscillations, in accordance with present embodiments.

Turning now to FIG. 4, a flow diagram is presented, illustrating an embodiment of a process 50 useful in providing adaptive power system stabilization (PSS) and control, by using, for example, the adaptive PSS system 40 executed by the one or more processors 36 included in the controller 32 depicted in FIGS. 1 and 2. The process 50 may include code or instructions stored in a non-transitory computer-readable medium (e.g., the memory 38) and executed, for example, by the one or more processors 36 included in the controller 32. The process 50 may begin with the adaptive PSS system 40 (e.g., via the one or more processors 36) receiving (block 52) the generator 14 operating parameter input signals. As previously discussed, the one or more processor 36 may receive various operating parameters (e.g., real power (P), reactive power (Q), and generator 14 terminal voltage, current and voltage on the field windings 22 and 30, power factor, frequency, and so forth), which may be used by the adaptive PSS system 40 to derive and control (e.g., via the one or more processors 36) operating parameters of interest such as, for example, PSS lead, lag, and gain constants of the generator 14. The parameters may additionally include certain equipment parameters provided by the manufacturer of equipment, such as insulation types, winding parameters, or any parameter related to the turbine 12, generator 14, exciter 16, and or power grid 26.

The process 50 may then continue with the adaptive PSS system 40 (e.g., via the one or more processors 36) filtering (block 54) the operating parameter input signals to remove noise and/or glitches in the input signals. The process 50 may then continue with the adaptive PSS system 40 determining (decision 56) whether a change in the operating state of the generator 14 has been detected. If a change in the operating state of, for example, the generator 14 and/or power grid 26 has been detected, then the process 50 may continue with the adaptive PSS system 40 (e.g., via the one or more processors 36) deriving (block 58) PSS settings based on the change in the operating state of, for example, the generator 14 and/or power grid 26. For example, as previously noted, the adaptive PSS system 40 may derive a set of specific linearized models of the system 10 (e.g., PSS lead, lag, and gain constants, and so forth) based on new operating conditions like real power (P), reactive power (Q), apparent power (S), power factor, frequency, terminal voltage, and so forth. In this way, the adaptive PSS system 40 may allow the controller 32 may damp generator 14 rotor angle oscillations over, for example, each of the inter-tie oscillation frequency sub range (e.g., approximately 0.1-1.0 Hz), local oscillation frequency sub range (e.g., approximately 1.0-2.0 Hz), intra-plant oscillation frequency sub range (e.g., approximately 2.0-3.0 Hz), and specifically over the entire operating frequency range and/or operating curve of the generator 14. The process 50 may then conclude with the adaptive PSS system 40 (e.g., via the one or more processors 36) performing (block 60) an update and application of the derived PSS settings (e.g., PSS lead, lag, and gain constants, and so forth) to control the performance of, for example, the generator 14.

Figure 5:
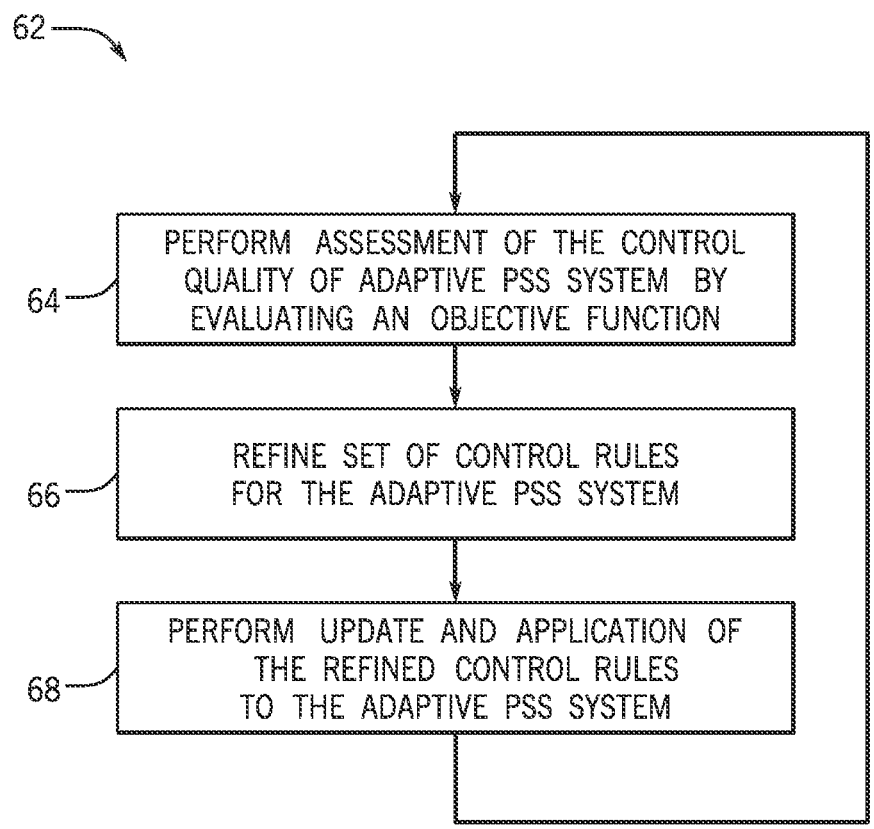
FIG. 5 is a flowchart illustrating an embodiment of a process suitable for providing on-line learning of PSS settings, in accordance with present embodiments.

Turning now to FIG. 5, another flow diagram is presented, illustrating an embodiment of a process 62 useful in providing on-line learning of PSS settings by using, for example, the adaptive PSS system 40 in conjunction with the control logic 42 and executed by the one or more processors 36 included in the controller 32 depicted in FIGS. 1 and 2. The process 62 may begin with the adaptive PSS system 40 (e.g., via the one or more processors 36) performing (block 64) an assessment of the control quality of the adaptive PSS system by evaluating an objective function. The process 62 may then continue with the adaptive PSS system 40 (e.g., via the one or more processors 36) in conjunction with the control logic 42 refining (block 66) the set of control rules (e.g., membership functions, Takagi-Sugeno parameters, and so forth) for the adaptive PSS system 40 by using one or more optimization techniques (e.g., Gaussian approximation, etc). The process 62 may then conclude with the adaptive PSS system 40 (e.g., via the one or more processors 36) in conjunction with the control logic 42 performing (block 68) an update and application of the refined control rules of the adaptive PSS system 40.

Technical effects relate to systems and methods for dynamically damping generator rotor power angle oscillations. Particularly, an adaptive PSS system is provided to continuously and adaptively derive PSS settings values for each possible oscillation frequency range (e.g., inter-tie frequency range, local frequency range, intra-plant frequency range, and so forth) of a generator, and thus damp generator rotor angle oscillations over the entire generator operating and/or output curve.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an excitation system, comprising:
a memory configured to store an adaptive power system stabilizer (PSS) system configured to dynamically stabilize an operation of a generator system; and
a processor communicatively coupled to the memory and configured to utilize the adaptive PSS system to derive a set of values for one or more operational parameters of the generator system, wherein the set of values is applied by the processor to operate the generator system when the generator system exhibits a plurality of interval operating frequency ranges associated with an oscillation of a power angle of the generator system, wherein each of the set of values corresponds to a different one of the plurality of interval operating frequency ranges, and wherein the set of values is configured to attenuate the oscillation of the power angle over the plurality of interval operating frequency ranges.

2. The system of claim 1, wherein the processor is configured to apply each of the set of values to the one or more operational parameters based at least in part on which of the plurality of interval operating frequency ranges the oscillation corresponds to.

3. The system of claim 1, wherein the plurality of interval operating frequency ranges comprises a plurality of interval frequency ranges between 0.1 Hz and 3.0 Hz, and wherein the processor is configured to attenuate the oscillation of the power angle for each frequency value between 0.1 Hz and 3.0 Hz.

4. The system of claim 3, wherein the plurality of interval operating frequency ranges comprises frequency ranges between 0.1 Hz and 0.5 Hz, between 0.1 Hz and 1.0 Hz, between 0.1 Hz and 1.5 Hz, between 0.1 Hz and 2.0 Hz, between 0.1 Hz and 2.5 Hz, between 0.1 Hz and 3.0 Hz, or any combination thereof.

5. The system of claim 1, wherein the plurality of interval operating frequency ranges comprises a first interval frequency range of 0.1 Hz to 1.0 Hz, a second interval frequency range of 1.0 Hz to 2.0 Hz, and at least a third interval frequency range of 2.0 Hz to 3.0 Hz.

6. The system of claim 1, wherein the processor is configured to utilize the adaptive PSS system to generate a training set of data for the set of values.

7. The system of claim 6, wherein the processor is configured to utilize the adaptive PSS system to derive a second set of values for one or more operational parameters of the generator system, and the memory is configured store a control logic, and wherein the processor is configured to execute the control logic to derive a set a rules associated with the set of values and the second set of values, wherein the set of rules comprises a rule logic by which to determine which of the set of values and second set of values is most suitable for adjusting the one or more operational parameters.

8. The system of claim 1, comprising:
a generator configured to provide an electrical power; and
an exciter coupled to the generator, wherein the excitation system is configured to regulate an output of the generator based at least in part on the oscillation of the power angle.

9. The system of claim 1, wherein the processor is configured to utilize the adaptive PSS system to attenuate the oscillation of a rotor power angle of the generator system as a response to instability during the operation of the generator system.

10. The system of claim 1, wherein the processor is configured to utilize the adaptive PSS system to derive the set of values for the one or more operational parameters based on a field voltage, a field current, a real power, a reactive power, a power factor, a frequency, a terminal voltage, or a combination thereof, of the generator system.

11. The system of claim 1, wherein the adaptive PSS system comprises a fuzzy logic controller (FLC), and wherein the FLC comprises a plurality of filters configured to filter an input of a field voltage, a field current, a real power, a reactive power, a power factor, a frequency, a terminal voltage, or a combination thereof, as the input is received by the adaptive PSS system.

12. A non-transitory computer-readable medium having computer executable code stored thereon, the code comprising instructions configured to:
derive a set of values for one or more operational parameters of a generator system, wherein the derived set of values is applied by a processor to operate the generator system when the generator system exhibits a plurality of interval operating frequency ranges associated with an oscillation of a power angle of the generator system, wherein each of the set of values corresponds to a different one of the plurality of interval operating frequency ranges, and wherein the derived set of values is configured to attenuate the oscillation of the power angle over each of the plurality of interval operating frequency ranges.

13. The non-transitory computer-readable medium of claim 12, wherein the code comprises instructions configured to apply the derived set of values to the one or more operational parameters based at least in part on which of the plurality of interval operating frequency ranges the oscillation corresponds to.

14. The non-transitory computer-readable medium of claim 12, wherein the code comprises instructions configured to attenuate the oscillation of the power angle for each frequency value in a range of 0.1 Hz to 3.0 Hz.

15. The non-transitory computer-readable medium of claim 12, wherein the code comprises instructions configured to generate a training set of data for the derived set of values.

16. The non-transitory computer-readable medium of claim 12, wherein the code comprises instructions to derive a rule associated with the derived set of values, wherein the rule comprises logic to derive a subset of values from the derived set of values as most suitable for adjusting the one or more operational parameters.

17. The non-transitory computer-readable medium of claim 12, wherein the code comprises instructions configured to attenuate the oscillation of a rotor power angle of the generator system to stabilize the operation of the generator system.

18. A system, comprising:
an excitation system configured to regulate one or more outputs of a power generating system, comprising:
a memory configured to store an adaptive power system stabilizer (PSS) system configured to dynamically stabilize an operation of the power generating system; and
a processor communicatively coupled to the memory and configured to execute the adaptive PSS system to derive a first set of values for one or more operational parameters of the power generating system when the power generating system is operational in a first state and to derive a second set of values for the one or more operational parameters when the power generating system is operational in a second state, wherein the second set of values is derived for each of a plurality of interval operating frequency ranges associated with the oscillation of the power angle, and wherein the second set of values is configured to attenuate an oscillation of a power angle associated with the power generating system over a complete operational output of the power generating system.

19. The system of claim 18, wherein the processor is configured to execute the adaptive PSS system to attenuate the oscillation of a rotor power angle of the generator system to stabilize the operation of a generator system.

* * * * *